(12) United States Patent
Ooishi et al.

(10) Patent No.: US 11,261,332 B2
(45) Date of Patent: Mar. 1, 2022

(54) POLYHALOGENATED ZINC PHTHALOCYANINE, POLYHALOGENATED ZINC PHTHALOCYANINE PIGMENT, AND COLOR FILTER INCLUDING PIXEL PORTION CONTAINING POLYHALOGENATED ZINC PHTHALOCYANINE PIGMENT

(71) Applicant: DIC Corporation, Tokyo (JP)

(72) Inventors: Kentarou Ooishi, Sakura (JP); Hideo Kaichi, Sakura (JP); Akira Kimura, Sakura (JP)

(73) Assignee: DIC Corporation, Tokyo (JP)

( * ) Notice: Subject to any disclaimer, the term of this patent is extended or adjusted under 35 U.S.C. 154(b) by 421 days.

(21) Appl. No.: 16/332,468

(22) PCT Filed: Sep. 7, 2017

(86) PCT No.: PCT/JP2017/032233
§ 371 (c)(1),
(2) Date: Mar. 12, 2019

(87) PCT Pub. No.: WO2018/051876
PCT Pub. Date: Mar. 22, 2018

(65) Prior Publication Data
US 2021/0277247 A1    Sep. 9, 2021

(30) Foreign Application Priority Data
Sep. 13, 2016 (JP) .............................. JP2016-178513

(51) Int. Cl.
*C09B 47/10* (2006.01)
*G02B 5/20* (2006.01)

(52) U.S. Cl.
CPC ................ *C09B 47/10* (2013.01); *G02B 5/20* (2013.01)

(58) Field of Classification Search
None
See application file for complete search history.

(56) References Cited

U.S. PATENT DOCUMENTS

| 2003/0151708 A1 | 8/2003 | Funakura et al. |
| 2012/0182638 A1 | 7/2012 | Takakuwa |

FOREIGN PATENT DOCUMENTS

| CN | 1460192 A | 12/2003 |
| JP | 2001-342374 A | 12/2001 |
| JP | 2007-284589 A | 11/2007 |
| JP | 2009-057435 A | 3/2009 |
| JP | 2010-049161 A | 3/2010 |
| JP | 2011-084726 A | 4/2011 |

OTHER PUBLICATIONS

International Search Report dated Oct. 3, 2017, issued for PCT/JP2017/032233.

*Primary Examiner* — Joseph R Kosack
(74) *Attorney, Agent, or Firm* — Locke Lord LLP; James E. Armstrong, IV; Nicholas J. DiCeglie, Jr.

(57) ABSTRACT

There is provided a polyhalogenated zinc phthalocyanine having good tinting strength and being capable of achieving higher brightness when the polyhalogenated zinc phthalocyanine is used in pixel portions of color filters. The object is achieved by providing the polyhalogenated zinc phthalocyanine represented by general formula 1: (wherein in general formula 1, $X_1$ to $X_{16}$ are each independently a chlorine atom, a bromine atom, or a hydrogen atom), in which a value obtained by dividing the maximum ion intensity, measured by mass spectrometry, in an m/z range of 1,780 (inclusive) to 1,820 (exclusive) by the maximum ion intensity in the m/z range of 1,820 (inclusive) to 1,860 (inclusive) is 1.00 or less.

3 Claims, 2 Drawing Sheets

POLYHALOGENATED ZINC PHTHALOCYANINE, POLYHALOGENATED ZINC PHTHALOCYANINE PIGMENT, AND COLOR FILTER INCLUDING PIXEL PORTION CONTAINING POLYHALOGENATED ZINC PHTHALOCYANINE PIGMENT

TECHNICAL FIELD

The present invention relates to a polyhalogenated zinc phthalocyanine pigment having a specific halogen distribution, and a color filter including a pixel portion containing the polyhalogenated zinc phthalocyanine pigment.

BACKGROUND ART

Color filters used in liquid crystal displays are members that enable color display on displays by transmitting white light emitted from backlights.

An example of the required characteristics of such a liquid crystal display is to have higher definition of a screen. Higher definition requires an improvement in pixel density. However, the aperture ratio of the screen is decreased, disadvantageously decreasing brightness. The decrease in brightness may be compensated by an increase in the quantity of light from a backlight. This, however, creates a new problem of increased power consumption. Accordingly, improvements in color filters have been advanced by the use of a pigment, such as Pigment Green 58, having high transmittance for light from a backlight.

An example of other required characteristics is a wider color reproduction range. An example of a typical index of the color reproduction range is an NTSC ratio. This is the ratio of a color gamut that can be covered when a color range that can be expressed by the NTSC system, which is the analog television broadcasting standard, on the CIE chromaticity diagram, is defined as 100%. In recent years, an NTSC ratio of 90% or more in terms of coverage has been required. To achieve that, in particular, an improvement in the tinting strength of green pixels is important. The improvement in tinting strength can be achieved by increasing the thickness of pixels. However, in the case of using a film that is composed of Pigment Green 58 described above and that has a practical thickness, it is difficult to achieve an NTSC ratio of 90% or more. In the case of using a pigment, such as Pigment Green 7 or 59, which can be formed into a film having a smaller thickness and a specific chromaticity, the resulting display disadvantageously has lowered brightness because the pigment has a lower transmittance than Pigment Green 58.

Under these circumstances, it is desired to develop a pigment that has high transmittance for light from a backlight and that has high brightness and high tinting strength.

To address these problems, a pigment composition containing a polyhalogenated zinc phthalocyanine having a specified halogen proportion is reported (Patent Literature 1). The pigment composition in Patent Literature 1, however, can fail to fully satisfy a recent increasing demand of markets, i.e., a demand for achieving higher brightness and higher tinting strength.

CITATION LIST

Patent Literature

PTL 1: Japanese Unexamined Patent Application Publication No. 2007-284589

SUMMARY OF INVENTION

Technical Problem

It is an object of the present invention to provide a polyhalogenated zinc phthalocyanine pigment having good tinting strength (high tinting strength) and being capable of achieving higher brightness (high brightness) when the pigment is used in pixel portions of color filters.

Solution to Problem

The inventors have conducted intensive studies and have found that the object is achieved by the use of a polyhalogenated zinc phthalocyanine having a specific halogen distribution described below. This finding has led to the completion of the present invention.

The present invention relates to a polyhalogenated zinc phthalocyanine (also referred to as a "polyhalogenated zinc phthalocyanine of the present invention") represented by general formula 1:

[Chem. 1]

general formula 1

(wherein in general formula 1, $X_1$ to $X_{16}$ are each independently a chlorine atom, a bromine atom, or a hydrogen atom), in which a value obtained by dividing the maximum ion intensity, measured by mass spectrometry, in an m/z range of 1,780 (inclusive) to 1,820 (exclusive) by the maximum ion intensity in the m/z range of 1,820 (inclusive) to 1,860 (inclusive) is 1.00 or less.

Advantageous Effects of Invention

The polyhalogenated zinc phthalocyanine pigment of the present invention has a significant effect of achieving higher tinting strength and higher brightness.

DESCRIPTION OF EMBODIMENTS

Figure 1:
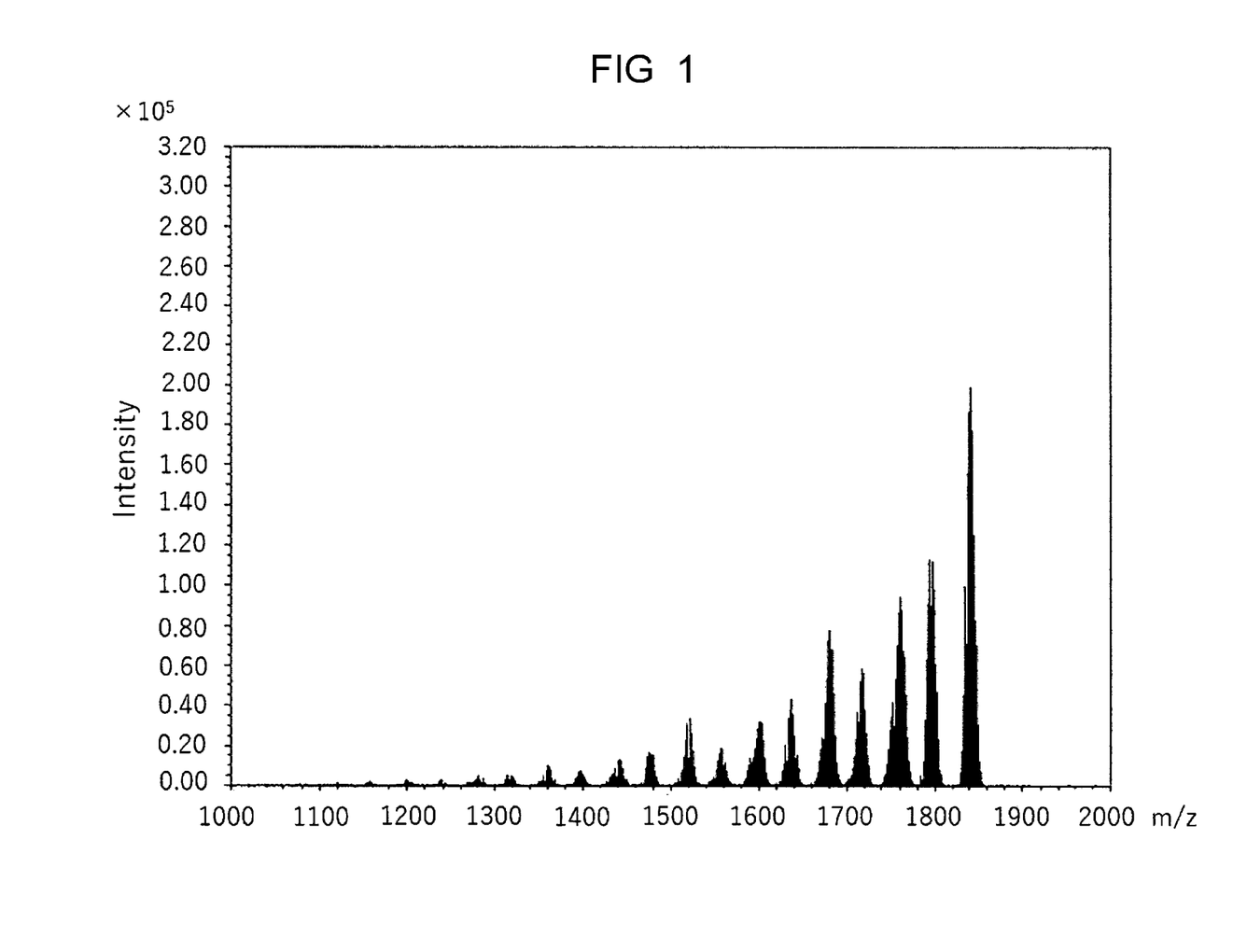
FIG. 1 illustrates the results of mass spectrometric analysis of a pigment composition of Synthesis example 2, in which the vertical axis represents the ion intensity, and the horizontal axis represents m/z.
Figure 2:
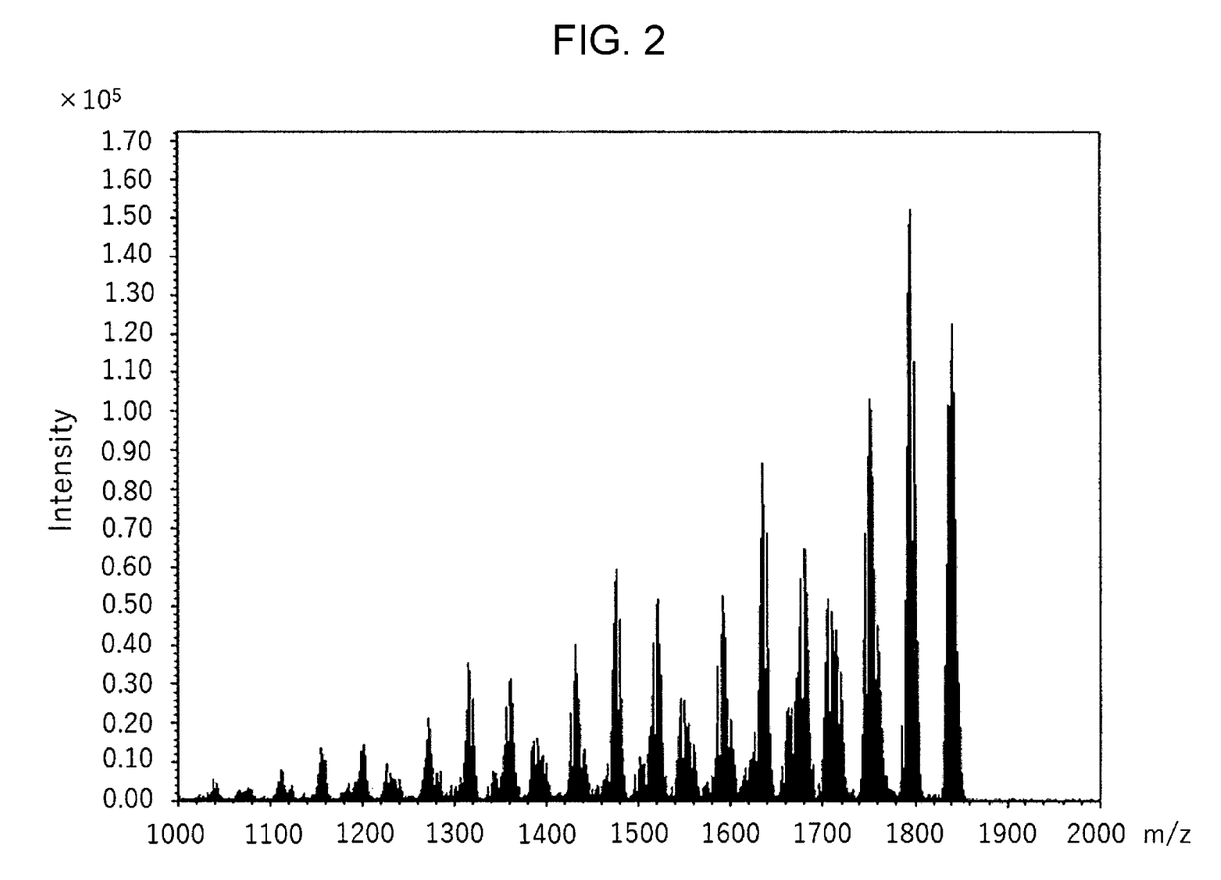
FIG. 2 illustrates the results of mass spectrometric analysis of a pigment composition of Comparative example 1, in which the vertical axis represents the ion intensity, and the horizontal axis represents m/z.

A polyhalogenated zinc phthalocyanine is a substance having a structure in which a total of up to 16 chlorine atoms and/or bromine atoms are bonded per phthalocyanine molecule (moiety). An increase in the number of chlorine atoms and/or bromine atoms bonded in its molecule allows the hue of the polyhalogenated zinc phthalocyanine to turn from blue to green.

As described above, the polyhalogenated zinc phthalocyanine of the present invention has good characteristics, i.e., high brightness and high tinting strength, compared with conventional polyhalogenated zinc phthalocyanines. Here, the reason the high-brightness feature is provided is presumably that the increased proportion of a brominated zinc phthalocyanine in which 16 bromine atoms are bonded per phthalocyanine molecule (moiety) (hereinafter, referred to as "16-brominated zinc phthalocyanine" in this specification) results in the reduced crystallinity of a pigment to inhibit the growth of pigment particles during a firing step in the production of a color filter, thereby reducing scattered light. The reason the high-tinting-strength feature is provided is presumably that the increased proportion of 16-brominated zinc phthalocyanine results in improved compound purity to obtain a steep absorption spectrum.

Here, the "increased proportion of 16-brominated zinc phthalocyanine" indicates that the case where the proportion of 16-brominated zinc phthalocyanine is equal to that of the brominated zinc phthalocyanine in which 15 bromine atoms and one chlorine atom are bonded (hereinafter, referred to as "15-brominated, 1-chlorinated zinc phthalocyanine" in this specification) or the case where the proportion of 16-brominated zinc phthalocyanine is higher than that of 15-brominated, 1-chlorinated zinc phthalocyanine.

In the present invention, the relationship of the proportions is defined on the basis of measurement results obtained by mass spectrometry as described below. That is, the present invention is characterized in that a value obtained by dividing the maximum ion intensity, measured by mass spectrometry, in an m/z range of 1,780 (inclusive) to 1,820 (exclusive) (i.e., the maximum intensity of ions originating from the 15-brominated, 1-chlorinated zinc phthalocyanine) by the maximum ion intensity in the m/z range of 1,820 (inclusive) to 1,860 (inclusive) (i.e., the maximum intensity of ions originating from the 16-brominated zinc phthalocyanine) is 1.00 or less.

No polyhalogenated zinc phthalocyanine having such properties has been known so far.

To provide the advantageous effects of the present invention more noticeably, the polyhalogenated zinc phthalocyanine is preferred in which a value obtained by dividing the maximum ion intensity, measured by mass spectrometry, in the m/z range of 1,780 (inclusive) to 1,820 (exclusive) by the maximum ion intensity in the m/z range of 1,820 (inclusive) to 1,860 (inclusive) is less than 1.00. The value is preferably 0.90 or less, more preferably 0.85 or less, even more preferably in the range of 0.85 to 0.50.

The mass spectrometry is performed with a matrix-assisted laser desorption/ionization time-of-flight mass spectrometer (JMS-S3000, available from JEOL, Ltd). Measurement parameters are set in such a manner that when a compound having a molecular weight known to be Q is subjected to mass spectrometry, m/z=Q is detected. In the present invention, the setting of JMS-S3000 was adjusted in such a manner that when a known compound having a molecular weight of 1,840 is subjected to mass spectrometry, m/z=1,840 was detected.

In the polyhalogenated zinc phthalocyanine of the present invention, a brominated zinc phthalocyanine in which 1 to 16 bromine atoms are bonded may be contained in any proportion as long as the foregoing relationship between the proportion of the 16-brominated zinc phthalocyanine and the proportion of the 15-brominated, 1-chlorinated zinc phthalocyanine is satisfied. Preferably, the polyhalogenated zinc phthalocyanine of the present invention preferably contains the 16-brominated zinc phthalocyanine in an amount of 14% or more.

The polyhalogenated zinc phthalocyanine of the present invention has a structure represented by general formula 1 illustrated above. In the present invention, the polyhalogenated zinc phthalocyanine having an average primary particle size of 0.01 to 0.30 μm is referred to as a polyhalogenated zinc phthalocyanine pigment.

The average primary particle size in the present invention refers to a value obtained by photographing particles in the field of view with a JEM-2010 transmission electron microscope (available from JEOL, Ltd.), measuring the longer diameters (major axes) of 50 primary particles of a halogenated zinc phthalocyanine constituting aggregates on a two-dimensional image, and averaging the diameters. In this case, the polyhalogenated zinc phthalocyanine as a sample is ultrasonically dispersed in a solvent before being photographed with the microscope. Instead of the transmission electron microscope, a scanning electron microscope may be used.

An embodiment of a method for producing a polyhalogenated zinc phthalocyanine of the present invention will be described below. However, the method for producing a polyhalogenated zinc phthalocyanine of the present invention should not be construed as being limited thereto.

The polyhalogenated zinc phthalocyanine can be prepared by the following known melting method: a halogenating agent such as sulfuryl chloride or bromine is added and mixed in advance with a melt that has a temperature of about 10° C. to about 170° C. and that consists of a compound or mixture of two or more compounds serving as a solvent during halogenation. Then zinc phthalocyanine is added thereto and halogenated.

Typically, the melting method is a technique in which zinc phthalocyanine is halogenated with a halogenating agent in a melt that has a temperature of about 10° C. to about 170° C. and that is composed of a compound or a mixture of two or more compounds serving as a solvent during the halogenation, these compounds being selected, for example, from alkali metal halides such as sodium chloride, alkaline-earth metal halides, aluminum chloride, titanium tetrachloride, and thionyl chloride. Conventionally, a method has been commonly employed in which a chlorinating agent is added to a melt, zinc phthalocyanine is added thereto, and a brominating agent is added thereto to adjust the bromination rate. In this method, however, it is difficult to sufficiently increase the proportion of "16-brominated zinc phthalocyanine" in the description of the polyhalogenated zinc phthalocyanine.

To prepare the polyhalogenated zinc phthalocyanine used in the present invention, the brominating agent and the chlorinating agent are preferably incorporated into the melt before the addition of zinc phthalocyanine, as described above.

Typically, in the melting method, the proportion of a polyhalogenated zinc phthalocyanine having a specific halogen atom composition in the resulting polyhalogenated zinc phthalocyanine can be freely controlled by adjusting a chloride and a bromide in the melt and changing the amounts of chlorine gas and bromine fed and a reaction time. This point is the same as in the present invention. As described above, the target proportion of the polyhalogenated zinc phthalocyanine having a desired halogen atom composition can be achieved by further adding a halogenating agent to a halogenated zinc phthalocyanine.

As described above, the halogenation temperature is preferably 10° C. to 170° C., more preferably 30° C. to 140° C. To increase the reaction rate, the reaction may be performed under pressure. The reaction time may be, for example, 1 to 100 hours, preferably 5 to 48 hours.

The amount of bromine used in the halogenation is preferably 15 to 40 equivalents, more preferably 18 to 28 equivalents per equivalent of zinc phthalocyanine.

In the present invention, a polyhalogenated zinc phthalocyanine having a halogen atom composition different from existing polyhalogenated zinc phthalocyanines can be prepared by optimizing a method for feeding raw materials, the amounts of raw materials, the reaction temperature, and the reaction time.

In any of the foregoing production methods, after completion of the reaction, the resulting mixture is charged into water or an acidic aqueous solution such as hydrochloric acid, thereby precipitating the formed polyhalogenated zinc phthalocyanine. The polyhalogenated zinc phthalocyanine may be used as it is. Preferably, after the precipitation, the polyhalogenated zinc phthalocyanine is filtered off, washed with water, an aqueous sodium bisulfate solution, an aqueous sodium bicarbonate solution, or an aqueous sodium hydroxide solution, if necessary, washed with an organic solvent such as acetone, toluene, methyl alcohol, ethyl alcohol, or dimethylformamide, and subjected to post-treatment such as drying before use.

The polyhalogenated zinc phthalocyanine, if necessary, is subjected to dry grinding in a pulverizer such as an attritor, a ball mill, a vibratory mill, or a vibratory ball mill and then converted into a pigment, for example, by a solvent salt milling method or a solvent boiling method, thereby providing a pigment that has better dispersibility and tinting strength than before the preparation of the pigment and that develops yellowish green with high lightness.

A method for converting a polyhalogenated zinc phthalocyanine into a pigment is not particularly limited. For example, the polyhalogenated zinc phthalocyanine before being converted into a pigment may be dispersed in a dispersion medium and simultaneously converted into a pigment. However, solvent salt milling treatment is preferably employed rather than solvent treatment in which a halogenated metal phthalocyanine is heated and stirred in a large amount of organic solvent from the viewpoint of easily inhibiting crystal growth and producing pigment particles having a large specific surface area.

The solvent salt milling includes kneading and grinding a crude pigment, an inorganic salt, and an organic solvent, the crude pigment being a polyhalogenated zinc phthalocyanine immediately after synthesis or a polyhalogenated zinc phthalocyanine that has been synthesized and then ground and that has not been converted into a pigment. In this case, the latter crude pigment is preferably used. Specifically, a crude pigment, an inorganic salt, and an organic solvent that does not dissolve them are charged into a kneading machine, and kneading and grinding are performed therein. Examples of the kneading machine than can be used in this case include a kneader and a mixing muller.

In the present invention, a polyhalogenated metal phthalocyanine pigment composition having an average primary particle size of 0.01 to 0.10 μm is preferably used for color filter applications. To synthesize the preferred polyhalogenated zinc phthalocyanine of the present invention, the amount of inorganic salt used is preferably larger than the amount of crude pigment used in the solvent salt milling. Specifically, the amount of the inorganic salt used is preferably 5 to 20 parts by mass, more preferably 7 to 15 parts by mass with respect to 1 part by mass of the crude pigment.

As the inorganic salt, a water-soluble inorganic salt can be preferably used. For example, an inorganic salt such as sodium chloride, potassium chloride, or sodium sulfate is preferably used. The inorganic salt having an average particle size of 0.5 to 50 μm is more preferably used. The inorganic salt can be easily produced by pulverizing the common inorganic salt.

As the organic solvent, an organic solvent that can inhibit crystal growth is preferably used. As such an organic solvent, a water-soluble organic solvent can be preferably used. Examples the water-soluble organic solvent that can be used include diethylene glycol, glycerol, ethylene glycol, propylene glycol, liquid poly(ethylene glycol), liquid poly(propylene glycol), 2-(methoxymethoxy) ethanol, 2-butoxyethanol, 2-(isopentyloxy) ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, and dipropylene glycol monomethyl ether. The amount of the water-soluble organic solvent used is preferably, but not necessarily, 0.01 to 5 parts by mass with respect to 1 part by mass of the crude pigment.

In a method for producing a pigment containing the polyhalogenated zinc phthalocyanine of the present invention, only the crude pigment may be subjected to solvent salt milling. The polyhalogenated zinc phthalocyanine and a phthalocyanine derivative may be used in combination and subjected to solvent salt milling. The phthalocyanine derivative may be added during the synthesis of the crude pigment or after the preparation of the pigment. The phthalocyanine derivative is preferably added before a pigment preparation step such as the solvent salt milling. The addition of the phthalocyanine derivative improves the viscosity characteristics and the dispersion stability of a resist ink for a color filter.

As the phthalocyanine derivative, any commonly used phthalocyanine derivative may be used. A phthalocyanine pigment derivative represented by formula (1) or (2) described below is preferred. The phthalocyanine derivative is preferably a phthalocyanine derivative corresponding to a polyhalogenated zinc phthalocyanine or zinc phthalocyanine serving as a raw material thereof. Because the phthalocyanine derivative is used in a small amount when used in combination, a polyhalogenated copper phthalocyanine or a copper phthalocyanine derivative may be used.

$$P-(Y)_n \qquad (1)$$

$$P-(A-Z)_n \qquad (2)$$

(where in the formulae, each P is a residue in which n hydrogen atoms are excluded from an unsubstituted or halogenated phthalocyanine ring with or without a central metal, Y is a primary, secondary, or tertiary amino group, a carboxylic group, a sulfonic group, or a salt of one of the foregoing groups and a base or a metal, A is a divalent linking group, Z is a residue in which at least one hydrogen atom on the nitrogen atom of a primary or secondary amino group is excluded or a residue in which at least one hydrogen atom on the nitrogen atom of a nitrogen-containing heterocyclic ring is excluded, m is 1 to 4, and n is 1 to 4).

An example of the central metal is Zn (zinc). Examples of the primary or secondary amino group include a monomethylamino group, a dimethylamino group, and a diethylamino group. Examples of the base or the metal that forms the salt with the carboxylic group or sulfonic group include organic bases such as ammonia, dimethylamine, diethylamine, and trimethylamine; and metals such as potassium, sodium, calcium, strontium, and aluminum. Examples of the divalent linking group denoted by A include divalent linking groups such as alkylene groups having 1 to 3 carbon atoms, $-CO_2-$, $-SO_2-$, and $-SO_2NH(CH_2)=_m-$. Examples of Z include a phthalimide group, monoalkylamino groups, and dialkylamino groups.

The amount of the phthalocyanine derivative that can be contained in the crude pigment at the time of the preparation of the crude pigment and/or the solvent salt milling is 0.01 to 0.3 parts by mass based on 1 part by mass of the crude pigment under normal conditions. In the case where the phthalocyanine derivative is used at the time of the preparation of the crude pigment and/or the solvent salt milling, the total amount of the crude pigment and the phthalocyanine derivative is regarded as the amount of the crude pigment used, and the amount of, for example, the inorganic salt used is selected from the foregoing range.

The temperature at which the solvent salt milling is performed is preferably 30° C. to 150° C., more preferably 80° C. to 100° C. The time for which the solvent salt milling is performed is preferably 5 hours to 20 hours, more preferably 8 to 18 hours.

In this way, a mixture containing the halogenated zinc phthalocyanine pigment having an average primary particle size of 0.01 to 0.10 μm, the inorganic salt, and the organic solvent as main components is provided. The organic solvent and the inorganic salt are removed from the mixture. If necessary, a solid mainly containing the polyhalogenated zinc phthalocyanine pigment is subjected to, for example, washing, filtration, drying, and pulverization to provide a polyhalogenated zinc phthalocyanine pigment powder.

As the washing, washing with water or hot water may be employed. The washing may be repeated one to five times. In the case of the mixture containing the water-soluble inorganic salt and the water-soluble organic solvent, the organic solvent and the inorganic salt can be easily removed by washing with water. If necessary, washing with acid, alkali, or a solvent may be performed to the extent that the crystal state is not changed.

For the drying after the filtration and the washing, for example, a batchwise or continuous drying operation is used in which the pigment is heated to 80° C. to 120° C. with a heating source installed in a dryer to remove water and/or the solvent. Examples of the dryer commonly used include compartment dryers, band dryers, and spray dryers. In particular, spray drying is preferred because of easy dispersion during the preparation of a paste. The pulverization after the drying is not an operation to increase the specific surface area or reduce the average primary particle size. The pulverization is performed in order to disintegrate and pulverize the pigment in the form of lumps produced when the drying is performed, for example, with a compartment dryer or a band dryer. For example, the pulverization is performed with a mortar, a hammer mill, a disk mill, a pin mill, or a jet mill. In this way, a dry powder mainly containing the polyhalogenated zinc phthalocyanine pigment of the present invention is produced.

The polyhalogenated zinc phthalocyanine pigment of the present invention has a low cohesive force of the primary particles and the property of being easily disintegrated, compared with conventional halogenated copper phthalocyanine pigments. The individual primary particles, which cannot be observed in conventional pigments, constituting aggregates can be observed in an electron micrograph.

The polyhalogenated zinc phthalocyanine pigment of the present invention can be used in any known application. In particular, because of an average primary particle size of 0.01 to 0.10 μm, the pigment aggregates relatively weakly and has improved dispersibility, for example, in a synthetic resin to be colored.

In the case where the polyhalogenated zinc phthalocyanine pigment of the present invention is used in green pixel portions of color filters, the pigment is preferred because the pigment is easily dispersed in photosensitive compositions for color filters, the light-shielding properties are reduced at 365 nm, which is a wavelength often used to cure photosensitive compositions for color filters, the photo-curing sensitivity thereof is not degraded, and the thinning of a film and pattern collapse during development do not occur easily. Green pixel portions of color filters that provide high sharpness and high lightness, which have been required in recent years, are more easily obtained.

When the primary particles of the polyhalogenated zinc phthalocyanine pigment of the present invention have an aspect ratio of 1 to 3, the pigment has improved viscosity characteristics and higher flowability in application fields. To determine the aspect ratio, particles in the field of view are photographed with a transmission electron microscope or a scanning electron microscope in the same way as in the case of determining of the average primary particle size. The average values of the longer diameters (major axes) and the shorter diameters (minor axes) of 50 primary particles constituting aggregates on a two-dimensional image are measured. The aspect ratio is calculated using these values.

The incorporation of the polyhalogenated zinc phthalocyanine pigment of the present invention into at least green pixel portions of a color filter provides a color filter of the present invention.

Similarly to conventional polyhalogenated zinc phthalocyanine pigments, the polyhalogenated zinc phthalocyanine pigment of the present invention can be used to produce the green pixel portions of the color filter without using a yellow pigment for toning or in the presence of a smaller amount of the yellow pigment if the yellow pigment is used in combination. It is thus possible to minimize a decrease in light transmittance over the entire range of 380 to 780 nm. In particular, the polyhalogenated zinc phthalocyanine pigment of the present invention has more yellowish color and higher tinting strength. Thus, in the case of an equivalent color density, the yellow pigment can be used in a smaller amount. This can advantageously result in a further increase in transmittance.

A spectral transmission spectrum in the present invention is determined with the type-1 spectrophotometer specified by Japanese Industrial Standard JIS Z 8722 (Methods of color measurement-Reflecting and transmitting objects). The spectral transmission spectrum is obtained by forming a resin film that contains the pigment composition and that has a predetermined dry film thickness described above, for example, on a glass substrate, subjecting the resin film to scan irradiation with light in a predetermined wavelength range, and plotting transmittance values at respective wavelengths.

In the case of using a light source such as white light or F10, the color filter including the green pixel portions containing the polyhalogenated zinc phthalocyanine pigment of the present invention can satisfactorily transmit the green emission line of the light source. Additionally, the polyhalogenated zinc phthalocyanine pigment has a sharp spectral transmission spectrum. Thus, the green color purity and the tinting strength can be maximized.

The polyhalogenated zinc phthalocyanine pigment of the present invention may be used as it is for the production of the green pixel portions of the color filter. If necessary, the polyhalogenated zinc phthalocyanine pigment of the present invention may be used in combination with a commonly used green halogenated copper phthalocyanine or a green halogenated metal phthalocyanine pigment such as another green halogenated heterometal phthalocyanine pigment in consideration of cost efficiency.

The polyhalogenated zinc phthalocyanine pigment of the present invention and the commonly used green halogenated metal phthalocyanine pigment are used in a ratio (by mass) of 100:0 to 80:20, preferably 100:0 to 90:10.

In addition to the green pigments, a yellow pigment may be used for toning in order to express characteristics. Examples of the yellow pigment that can be used include C.I. Pigment Yellow (PY) 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 126, 127, 128, 129, 138, 139, 150, 151, 152, 153, 154, 155, 156, 161, 162, 164, 166, 167, 168, 169, 170, 171, 172, 173, 174, 175, 176, 177, 179, 180, 181, 182, 185, 187, 199, and 231. PY 83, 138, 139, 150, 185, or 231 is preferably used, more preferably PY 138, 150, 185, or 231 because these pigments have high brightness or because these pigments can be used in small amounts and thus are suitable for a reduction in film thickness. These pigments may be used alone or in combination of two or more. Regarding the proportions of the polyhalogenated zinc phthalocyanine pigment of the present invention and the yellow pigment, 10 to 100 parts by mass of the yellow pigment is used per 100 parts by mass of the polyhalogenated zinc phthalocyanine pigment.

The use of the polyhalogenated zinc phthalocyanine pigment of the present invention enables the green pixel portions of the color filter to have low turbidity, good color purity, good tinting strength, and high brightness even if the yellow pigment is used for toning, compared with the conventional case where two or more pigments of different colors are mixed for toning.

For example, compared with the case of using a pigment mixture of a conventional green pigment such as C.I. Pigment Green 7 or 36 and the yellow pigment, the use of the polyhalogenated zinc phthalocyanine pigment of the present invention in combination with the yellow pigment results in a small decrease in brightness and a large quantity of light passing through a green region because of its high color purity and high tinting strength.

The polyhalogenated zinc phthalocyanine pigment of the present invention can be used for the formation of a pattern of the green pixel portions of the color filter by a known method. Typically, a photosensitive composition that is used for the green pixel portions of the color filter and that contains the polyhalogenated zinc phthalocyanine pigment of the present invention and a photosensitive resin as essential components can be prepared.

An example of a method for producing the color filter is what is called a photolithography method. For example, a green pattern is formed by dispersing the polyhalogenated zinc phthalocyanine pigment in a dispersion medium consisting of the photosensitive resin, applying the resulting dispersion to a transparent substrate composed of, for example, glass by a spin coating method, a roll coating method, an inkjet method, or the like, subjecting the resulting coating film to pattern exposure to ultraviolet light using a photomask, and washing the unexposed portions with a solvent or the like.

The color filter may be produced by forming the pattern of the green pixel portions using an electrodeposition method, a transfer method, an electrolytic micelle disruption method, or a photovoltaic electrodeposition (PVED) method. A pattern of red pixel portions and a pattern of blue pixel portions can be formed with known pigments in a similar manner.

To prepare the photosensitive composition for green pixel portions of color filters, for example, the polyhalogenated zinc phthalocyanine pigment of the present invention, the photosensitive resin, a photopolymerization initiator, and an organic solvent that dissolves the resin are mixed as essential components. A typical preparation method thereof includes preparing a dispersion containing the polyhalogenated zinc phthalocyanine pigment, the organic solvent, and, if necessary, a dispersant, and adding the photosensitive resin and so forth thereto.

As the polyhalogenated zinc phthalocyanine pigment used here, the polyhalogenated zinc phthalocyanine pigment that may or may not contain the phthalocyanine derivative and, if necessary, the yellow pigment can be used.

Examples of the dispersant used as needed include Disperbyk (registered trademark) 130, 161, 162, 163, and 170 available from BYK Chemie and Efka 46 and Efka 47 available from BASF. Additionally, a leveling agent, a coupling agent, a cationic surfactant, and so forth may also be used.

Examples of the organic solvent include aromatic solvents such as toluene, xylene, and methoxybenzene; acetate solvents such as ethyl acetate, butyl acetate, propylene glycol monomethyl ether acetate, and propylene glycol monoethyl ether acetate; propionate solvents such as ethoxyethyl propionate; alcoholic solvents such as methanol and ethanol; ethereal solvents such as butyl cellosolve, propylene glycol monomethyl ether, diethylene glycol ethyl ether, and diethylene glycol dimethyl ether; ketonic solvents such as methyl ethyl ketone, methyl isobutyl ketone, and cyclohexanone; aliphatic hydrocarbon solvents such as hexane; nitrogen compound solvents such as N,N-dimethylformamide, γ-butyrolactam, N-methyl-2-pyrrolidone, aniline, and pyridine; lactone-based solvents such as γ-butyrolactone; carbamates such as a mixture of methyl carbamate and ethyl carbamate in a ratio of 48:52; and water. Particularly suitable examples of the organic solvent include water-soluble polar solvents such as propionate solvents, alcoholic solvents, ethereal solvents, ketonic solvents, nitrogen compound solvents, lactone solvents, and water.

Specifically, 100 parts by mass of the polyhalogenated zinc phthalocyanine pigment of the present invention, 300 to 1,000 parts by mass of the organic solvent, and, if necessary, 0 to 100 parts by mass of the dispersant and/or 0 to 20 parts by mass of the phthalocyanine derivative can be stirred and dispersed uniformly to prepare a dispersion. Then 3 to 20 parts by mass of a photosensitive resin per 100 parts by mass of the polyhalogenated zinc phthalocyanine pigment of the present invention, 0.05 to 3 parts by mass of a photopolymerization initiator per 1 part by mass of the photosensitive resin, and, if necessary, an organic solvent are added to the dispersion. The mixture is stirred and dispersed uniformly to provide a photosensitive composition for green pixel portions of color filters.

Examples of the photosensitive resin that can be used here include thermoplastic resins such as urethane resins, acrylic resins, polyamic acid resins, polyimide resins, styrene-maleic acid resins, styrene-maleic anhydride resins; and photopolymerizable monomers such as bifunctional monomers, e.g., 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate, and polyfunctional monomers, e.g., trimethylolpropane triacrylate, pentaerythritol triacrylate, tris(2-hydroxyethyl) isocyanate, dipentaerythritol hexaacrylate, and dipentaerythritol pentaacrylate.

Examples of the photopolymerization initiator include acetophenone, benzophenone, benzil dimethylketal, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid.

The resulting photosensitive composition for green pixel portions of color filters is subjected to pattern exposure to ultraviolet light using a photomask. Then unexposed portions are removed by rinsing with an organic solvent or alkaline water, thereby producing a color filter.

The polyhalogenated zinc phthalocyanine pigment produced in the present invention is more yellowish green, has high tinting strength, and develops a bright green color with high color purity and high contrast. In addition to the color filter detailed above, thus, the pigment is suitably used as a colorant for, for example, paint, plastics, printing ink, rubber, leather, textile printing, electronic toner, jet ink, and thermal transfer ink.

EXAMPLES

While the present invention will be described on the basis of examples, the present invention is not limited thereto. In examples and comparative examples, "part(s)" and "%" are on a mass basis, unless otherwise specified.

Reference Example (Production Example of Zinc Phthalocyanine Used Below)

Zinc phthalocyanine was produced from phthalonitrile, ammonia, and zinc chloride as raw materials. After completion of the reaction, a solution of zinc phthalocyanine in 1-chloronaphthalene absorbed light at 750 to 850 nm.

Synthesis Example 1

First, 270 parts of sulfuryl chloride (Wako Pure Chemical Industries, Ltd., product code: 190-04815), 315 parts of anhydrous aluminum chloride (Kanto Chemical Co., Inc., product code: 01156-00), 43 parts of sodium chloride (Tokyo Chemical Industry Co., Ltd., product code: S0572), and 43 parts of bromine were mixed. To the resulting mixture, 65 parts of zinc phthalocyanine produced in Reference Example was added. Then 407 parts of bromine (Wako Pure Chemical Industries, Ltd., product code: 026-02405) was added dropwise thereto. The mixture was heated to 80° C. over a period of 22 hours, and 72 parts of bromine was added dropwise thereto. The mixture was heated to 130° C. over a period of 3 hours. The reaction mixture was taken in water to precipitate a crude polyhalogenated zinc phthalocyanine pigment. The aqueous slurry was filtered, washed with hot water having a temperature of 60° C., and repeptized in water. The resulting slurry was refiltered, washed with hot water having a temperature of 60° C., dried at 90° C. to give 173 parts of a crude polyhalogenated zinc phthalocyanine pigment. Next, 3 parts of the crude polyhalogenated zinc phthalocyanine pigment, 30 parts of ground sodium chloride, and 3 parts of diethylene glycol were charged into a twin-arm kneader and kneaded at 100° C. for 8 hours. After kneading, the mixture was taken in 300 parts of water having a temperature of 80° C. The mixture was stirred for 1 hour, filtered, washed with hot water, dried, and pulverized to provide a polyhalogenated zinc phthalocyanine pigment. The results of mass spectrometric analysis (JMS-S3000, JEOL, Ltd.) of the polyhalogenated zinc phthalocyanine pigment revealed that a value obtained by dividing the maximum ion intensity in an m/z range of 1,780 (inclusive) to 1,820 (exclusive) by the maximum ion intensity in the m/z range of 1,820 (inclusive) to 1,860 (inclusive) was 0.71. In this case, the delay time was 310 ns. The resolving power value of a peak observed in the m/z range of 1,820 (inclusive) to 1,860 (inclusive) was 42,004.

Synthesis Example 2

First, 270 parts of sulfuryl chloride (Wako Pure Chemical Industries, Ltd., product code: 190-04815), 315 parts of anhydrous aluminum chloride (Kanto Chemical Co., Inc., product code: 01156-00), 43 parts of sodium chloride (Tokyo Chemical Industry Co., Ltd., product code: S0572), and 43 parts of bromine were mixed. To the resulting mixture, 65 parts of zinc phthalocyanine produced in Reference Example was added. Then 407 parts of bromine (Wako Pure Chemical Industries, Ltd., product code: 026-02405) was added dropwise thereto. The mixture was heated to 80° C. over a period of 22 hours, and 72 parts of bromine was added dropwise thereto. The mixture was heated to 100° C. over a period of 3 hours. The reaction mixture was taken in water to precipitate a crude polyhalogenated zinc phthalocyanine pigment. The aqueous slurry was filtered, washed with hot water having a temperature of 60° C., and repeptized in water. The resulting slurry was refiltered, washed with hot water having a temperature of 60° C., dried at 90° C. to give 173 parts of a crude polyhalogenated zinc phthalocyanine pigment. Next, 3 parts of the crude polyhalogenated zinc phthalocyanine pigment, 30 parts of ground sodium chloride, and 3 parts of diethylene glycol were charged into a twin-arm kneader and kneaded at 100° C. for 8 hours.

After kneading, the mixture was taken in 300 parts of water having a temperature of 80° C. The mixture was stirred for 1 hour, filtered, washed with hot water, dried, and pulverized to provide a polyhalogenated zinc phthalocyanine pigment. The results of mass spectrometric analysis (JMS-S3000, JEOL, Ltd.) of the polyhalogenated zinc phthalocyanine pigment revealed that a value obtained by dividing the maximum ion intensity in an m/z range of 1,780 (inclusive) to 1,820 (exclusive) by the maximum ion intensity in the m/z range of 1,820 (inclusive) to 1,860 (inclusive) was 0.57. In this case, the delay time was 285 ns. The resolving power value of a peak observed in the m/z range of 1,820 (inclusive) to 1,860 (inclusive) was 42,672.

Synthesis Example 3

First, 270 parts of sulfuryl chloride (Wako Pure Chemical Industries, Ltd., product code: 190-04815), 315 parts of anhydrous aluminum chloride (Kanto Chemical Co., Inc., product code: 01156-00), 43 parts of sodium chloride (Tokyo Chemical Industry Co., Ltd., product code: S0572), and 43 parts of bromine were mixed. To the resulting mixture, 65 parts of zinc phthalocyanine produced in Reference Example was added. Then 407 parts of bromine (Wako Pure Chemical Industries, Ltd., product code: 026-02405) was added dropwise thereto. The mixture was heated to 80° C. over a period of 22 hours, and 72 parts of bromine was added dropwise thereto. The mixture was heated to 90° C. over a period of 3 hours. The reaction mixture was taken in water to precipitate a crude polyhalogenated zinc phthalocyanine pigment. The aqueous slurry was filtered, washed with hot water having a temperature of 60° C., and repeptized in water. The resulting slurry was refiltered, washed with hot water having a temperature of 60° C., dried at 90° C. to give 173 parts of a crude polyhalogenated zinc phthalocyanine pigment. Next, 3 parts of the crude polyhalogenated zinc phthalocyanine pigment, 30 parts of ground sodium chloride, and 3 parts of diethylene glycol were charged into a twin-arm kneader and kneaded at 100° C. for 8 hours. After kneading, the mixture was taken in 300 parts of water having a temperature of 80° C. The mixture was stirred for 1 hour, filtered, washed with hot water, dried, and pulverized to provide a polyhalogenated zinc phthalocyanine pigment. The results of mass spectrometric analysis (JMS-S3000, JEOL, Ltd.) of the polyhalogenated zinc phthalocyanine pigment revealed that a value obtained by dividing the maximum ion intensity in an m/z range of 1,780 (inclusive) to 1,820 (exclusive) by the maximum ion intensity in the m/z range of 1,820 (inclusive) to 1,860 (inclusive) was 0.56. In this case, the delay time was 285 ns. The resolving power value of a peak observed in the m/z range of 1,820 (inclusive) to 1,860 (inclusive) was 37,665.

Synthesis Example 4

First, 270 parts of sulfuryl chloride (Wako Pure Chemical Industries, Ltd., product code: 190-04815), 347 parts of anhydrous aluminum chloride (Kanto Chemical Co., Inc., product code: 01156-00), 43 parts of sodium chloride (Tokyo Chemical Industry Co., Ltd., product code: S0572), and 43 parts of bromine were mixed. To the resulting mixture, 65 parts of zinc phthalocyanine produced in Reference Example was added. Then 407 parts of bromine (Wako Pure Chemical Industries, Ltd., product code: 026-02405) was added dropwise thereto. The mixture was heated to 80° C. over a period of 22 hours, and 72 parts of bromine was added dropwise thereto. The mixture was heated to 120° C. over a period of 3 hours. The reaction mixture was taken in water to precipitate a crude polyhalogenated zinc phthalocyanine pigment. The aqueous slurry was filtered, washed with hot water having a temperature of 60° C., and repeptized in water. The resulting slurry was refiltered, washed with hot water having a temperature of 60° C., dried at 90° C. to give 173 parts of a crude polyhalogenated zinc phthalocyanine pigment. Next, 3 parts of the crude polyhalogenated zinc phthalocyanine pigment, 30 parts of ground sodium chloride, and 3 parts of diethylene glycol were charged into a twin-arm kneader and kneaded at 100° C. for 8 hours. After kneading, the mixture was taken in 300 parts of water having a temperature of 80° C. The mixture was stirred for 1 hour, filtered, washed with hot water, dried, and pulverized to provide a polyhalogenated zinc phthalocyanine pigment. The results of mass spectrometric analysis (JMS-S3000, JEOL, Ltd.) of the polyhalogenated zinc phthalocyanine pigment revealed that a value obtained by dividing the maximum ion intensity in an m/z range of 1,780 (inclusive) to 1,820 (exclusive) by the maximum ion intensity in the m/z range of 1,820 (inclusive) to 1,860 (inclusive) was 0.81. In this case, the delay time was 300 ns. The resolving power value of a peak observed in the m/z range of 1,820 (inclusive) to 1,860 (inclusive) was 28,832.

Synthesis Example 5

First, 270 parts of sulfuryl chloride (Wako Pure Chemical Industries, Ltd., product code: 190-04815), 315 parts of anhydrous aluminum chloride (Kanto Chemical Co., Inc., product code: 01156-00), 43 parts of sodium chloride (Tokyo Chemical Industry Co., Ltd., product code: S0572), and 461 parts of bromine were mixed. To the resulting mixture, 67 parts of zinc phthalocyanine produced in Reference Example was added. The mixture was heated to 80° C. over a period of 22 hours, and 147 parts of bromine was added dropwise thereto. The mixture was heated to 130° C. over a period of 3 hours and held for 1 hour. The reaction mixture was taken in water to precipitate a crude polyhalogenated zinc phthalocyanine pigment. The aqueous slurry was filtered, washed with hot water having a temperature of 60° C., and repeptized in water. The resulting slurry was refiltered, washed with hot water having a temperature of 60° C., dried at 90° C. to give 178 parts of a crude polyhalogenated zinc phthalocyanine pigment. Next, 3 parts of the crude polyhalogenated zinc phthalocyanine pigment, 30 parts of ground sodium chloride, and 3 parts of diethylene glycol were charged into a twin-arm kneader and kneaded at 100° C. for 8 hours. After kneading, the mixture was taken in 300 parts of water having a temperature of 80° C. The mixture was stirred for 1 hour, filtered, washed with hot water, dried, and pulverized to provide a polyhalogenated zinc phthalocyanine pigment. The results of mass spectrometric analysis (JMS-S3000, JEOL, Ltd.) of the polyhalogenated zinc phthalocyanine pigment revealed that a value obtained by dividing the maximum ion intensity in an m/z range of 1,780 (inclusive) to 1,820 (exclusive) by the maximum ion intensity in the m/z range of 1,820 (inclusive) to 1,860 (inclusive) was 0.69. In this case, the delay time was 400 ns. The resolving power value of a peak observed in the m/z range of 1,820 (inclusive) to 1,860 (inclusive) was 37,637.

Example 1

First, 2.48 g of the polyhalogenated zinc phthalocyanine pigment produced in Synthesis example 1, 1.24 g of BYK-LPN 6919 available from BYK Chemie, 1.86 g of Unidic ZL-295 available from DIC Corporation, and 10.92 g of propylene glycol monomethyl ether acetate were dispersed for 2 hours with a paint shaker available from Toyo Seiki Seisaku-sho, Ltd. using zircon beads having a size of 0.3 to 0.4 mm to prepare coloring composition (1). Next, 4.0 g of coloring composition (1), 0.98 g of Unidic ZL-295 available from DIC Corporation, and 0.22 g of propylene glycol monomethyl ether acetate were mixed using a paint shaker to prepare evaluation composition (1-A) used to form green pixel portions of a color filter.

Next, 2.48 g of Pigment Yellow 138 (Paliotol Yellow D0960, BASF Japan Ltd.), 1.24 g of BYK-LPN 6919 available from BYK Chemie, 1.86 g of Unidic ZL-295 available from DIC Corporation, and 10.92 g of propylene glycol monomethyl ether acetate were dispersed for 2 hours with a paint shaker available from Toyo Seiki Seisaku-sho, Ltd. using zircon beads having a size of 0.3 to 0.4 mm to prepare coloring composition (7). Then 4.0 g of coloring composition (7), 0.98 g of Unidic ZL-295 available from DIC Corporation, and 0.22 g of propylene glycol monomethyl ether acetate were mixed using a paint shaker to prepare toning composition (7-A) used to form green pixel portions of a color filter.

Toning composition (7-A) and evaluation composition (1-A) were mixed in such a manner that chromaticity coordinates (x, y) were (0.286, 0.575). The mixture was formed into a film, followed by drying to provide evaluation glass substrate (1-B).

Examples 2 to 5

Coloring compositions (2) to (5), evaluation compositions (2-A) to (5-A), and evaluation glass substrates (2-B) to (5-B) were produced in the same ways as in Example 1 from the polyhalogenated zinc phthalocyanine pigments prepared in Synthesis Examples 2 to 5.

Comparative Example 1

(1) First, 270 parts of sulfuryl chloride (Wako Pure Chemical Industries, Ltd., product code: 190-04815), 315 parts of anhydrous aluminum chloride (Kanto Chemical Co., Inc., product code: 01156-00), and 43 parts of sodium chloride (Tokyo Chemical Industry Co., Ltd., product code: S0572) were mixed. To the resulting mixture, 63 parts of zinc phthalocyanine produced in Reference Example was added. Then 367 parts of bromine (Wako Pure Chemical Industries, Ltd., product code: 026-02405) was added dropwise thereto. The mixture was heated to 80° C. over a period of 22 hours, and 69 parts of bromine was added dropwise thereto. The mixture was heated to 130° C. over a period of 3 hours and held for 1 hour. The reaction mixture was taken in water to precipitate a crude polyhalogenated zinc phthalocyanine pigment. The aqueous slurry was filtered, washed with hot water having a temperature of 60° C., and repeptized in water. The resulting slurry was refiltered, washed with hot water having a temperature of 60° C., dried at 90° C. to give 169 parts of a crude polyhalogenated zinc phthalocyanine pigment. Next, 3 parts of the crude polyhalogenated zinc phthalocyanine pigment, 30 parts of ground sodium chloride, and 3 parts of diethylene glycol were charged into a twin-arm kneader and kneaded at 100° C. for 8 hours. After kneading, the mixture was taken in 300 parts of water having a temperature of 80° C. The mixture was stirred for 1 hour, filtered, washed with hot water, dried, and pulverized to provide a polyhalogenated zinc phthalocyanine pigment. The results of mass spectrometric analysis (JMS-S3000, JEOL, Ltd.) of the polyhalogenated zinc phthalocyanine pigment revealed that a value obtained by dividing the maximum ion intensity in an m/z range of 1,780 (inclusive) to 1,820 (exclusive) by the maximum ion intensity in the m/z range of 1,820 (inclusive) to 1,860 (inclusive) was 1.24. In this case, the delay time was 495 ns. The resolving power value of a peak observed in the m/z range of 1,820 (inclusive) to 1,860 (inclusive) was 36,553.

(2) First, 2.48 g of the polyhalogenated zinc phthalocyanine pigment produced in (1), 1.24 g of BYK-LPN 6919 available from BYK Chemie, 1.86 g of Unidic ZL-295 available from DIC Corporation, and 10.92 g of propylene glycol monomethyl ether acetate were dispersed for 2 hours with a paint shaker available from Toyo Seiki Seisaku-sho, Ltd. using zircon beads having a size of 0.3 to 0.4 mm to prepare coloring composition (6). Next, 4.0 g of coloring composition (6), 0.98 g of Unidic ZL-295 available from DIC Corporation, and 0.22 g of propylene glycol monomethyl ether acetate were mixed using a paint shaker to prepare comparative composition (6-A) used to form green pixel portions of a color filter.

(3) Toning composition (7-A) and comparative composition (6-A) prepared in (2) were mixed in such a manner that chromaticity coordinates (x, y) were (0.286, 0.575). The mixture was formed into a film, followed by drying to provide comparative glass substrate (6-B).

Test Example

The brightness of evaluation glass substrates (1-B) to (5-B) and comparative glass substrate (6-B) was measured with a U3900 spectrophotometer available from Hitachi High-Tech Science Corporation. The film thickness of evaluation glass substrates (1-B) to (5-B) and comparative glass substrate (6-B) was measured with a VS1330 coherence scanning interferometer available from Hitachi High-Tech Science Corporation. The measurement results of the brightness and the film thickness are presented in a table below (values measured in the case of using the comparative glass substrate were defined as 100.0%, and the evaluations were made).

TABLE 1

|  | Comparative glass substrate (6-B) | Evaluation glass substrate (1-B) | Evaluation glass substrate (2-B) | Evaluation glass substrate (3-B) | Evaluation glass substrate (4-B) | Evaluation glass substrate (5-B) |
| --- | --- | --- | --- | --- | --- | --- |
| Brightness | 100.0% | 100.7% | 100.6% | 100.3% | 101.0% | 100.8% |
| Film thickness | 100.0% | 98.9% | 97.0% | 96.9% | 98.9% | 98.0% |

A table below presents values obtained by dividing the maximum ion intensities of the polyhalogenated zinc phthalocyanine pigments prepared in Synthesis examples 1 to 5 and Comparative example 1(1) in the m/z range of 1,780 (inclusive) to 1,820 (exclusive) by the respective maximum ion intensities in the m/z range of 1,820 (inclusive) to 1,860 (inclusive).

TABLE 2

| Comparative example 1 | Synthesis example 1 | Synthesis example 2 | Synthesis example 3 | Synthesis example 4 | Synthesis example 5 |
| --- | --- | --- | --- | --- | --- |
| 1.24 | 0.71 | 0.57 | 0.56 | 0.81 | 0.69 |

The foregoing results demonstrated that the brightness and the film thickness after the color was adjusted to the chromaticity coordinates (x, y)=(0.286, 0.575) (Japanese Unexamined Patent Application Publication No. 2016-80919) using the transmission spectrum of each of the polyhalogenated zinc phthalocyanines produced in the present invention and the transmission spectrum of Pigment Yellow 138 were superior to those using the transmission spectrum of an existing polyhalogenated zinc phthalocyanine.

The invention claimed is:
1. A composition comprising a mixture of polyhalogenated zinc phthalocyanines represented by general formula 1:

[Chem. 1]

general formula 1 wherein in general formula 1, $X_1$ to $X_{16}$ are each independently a chlorine atom, a bromine atom, or a hydrogen atom,
wherein a value obtained by dividing a maximum ion intensity, measured by mass spectrometry, in an m/z range of 1,780 (inclusive) to 1,820 (exclusive) by a maximum ion intensity in the m/z range of 1,820 (inclusive) to 1,860 (inclusive) is 1.00 or less, and where in the composition comprises 15-brominated, 1-chlorinated zinc phthalocyanine and 16-brominated zinc phthalocyanine.

2. A pigment dispersion comprising at least the composition according to claim 1 and an organic solvent.

3. A color filter comprising a pixel portion containing the composition according to claim 1.

* * * * *